April 21, 1959   J. A. KRAPF   2,882,869
PISTON CUSHIONED FLUID PRESSURE ACTUATOR
Filed Dec. 12, 1955   2 Sheets-Sheet 1
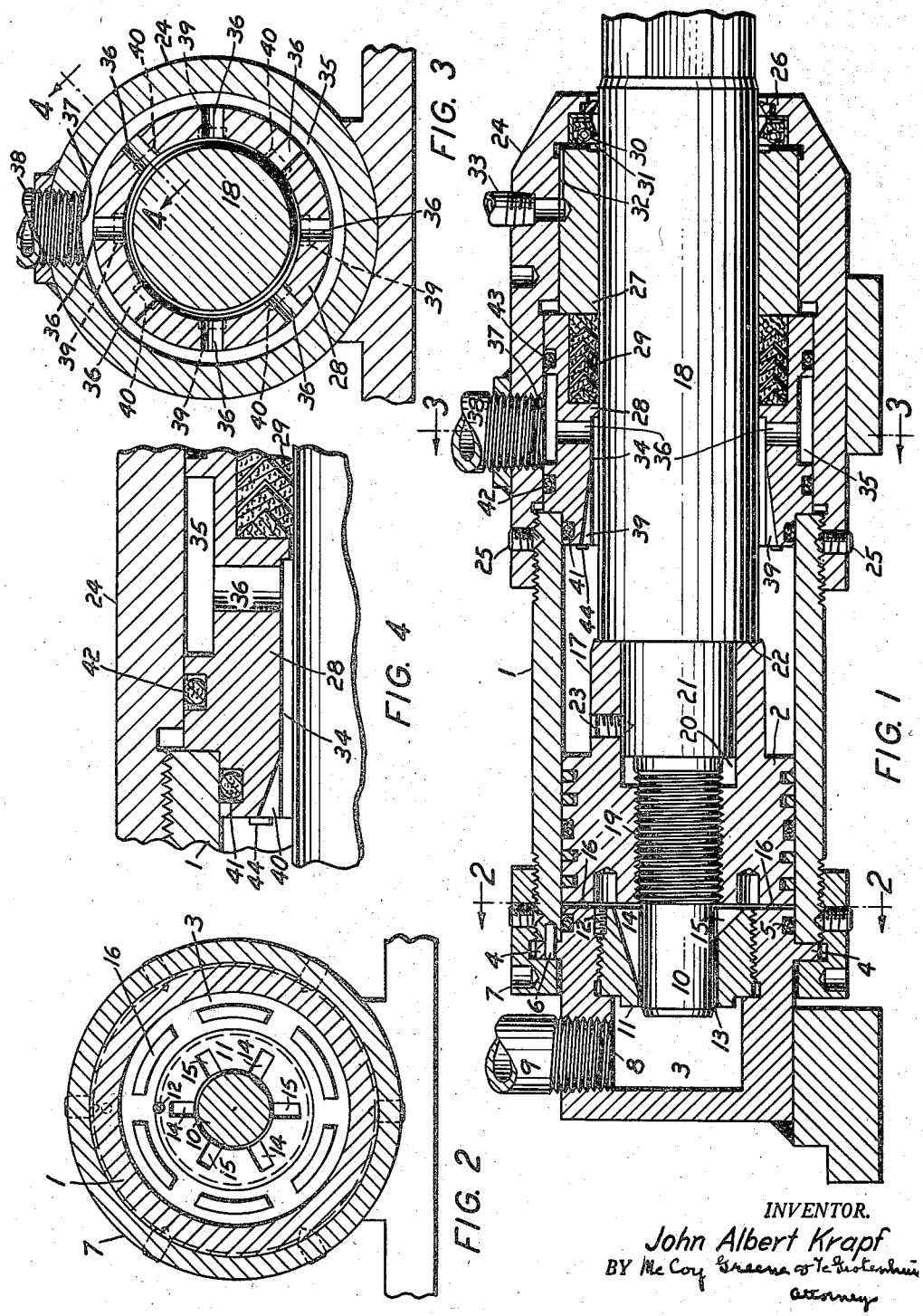
INVENTOR.
John Albert Krapf INVENTOR.
John Albert Krapf

United States Patent Office 2,882,869
Patented Apr. 21, 1959

2,882,869

PISTON CUSHIONED FLUID PRESSURE ACTUATOR

John Albert Krapf, Cleveland Heights, Ohio

Application December 12, 1955, Serial No. 552,364

6 Claims. (Cl. 121—132)

This invention relates to fluid pressure actuators of the cylinder and piston type and particularly to means for cushioning the impact against the cylinder heads.

In the device of the present invention the piston velocity is decelerated as it approaches the end of a stroke to reduce the impact force by back pressure on the piston that is created by retarding the discharge of fluid from the cylinder and, in order to effectively check the piston without limiting the length of the stroke, without a sudden change in resistance to movement and without excessive heating of the fluid, means is provided for progressively restricting the flow of fluid being forced out of the cylinder by the piston, thereby creating a back pressure that decelerates the piston during its approach to its limit of movement and that reduces the force of impact of the piston against the cylinder head or other movement limiting stop.

The discharge of fluid is controlled by a member forming an extension of the piston that moves into and out of a telescopic relationship with a member forming a fixed portion of the end of the cylinder. The piston extension and the cylinder attached member when in telescopic relation provide a flow control valve and are so formed that flow of fluid past them is progressively and increasingly restricted as the forward end of the piston extension approaches the end of its stroke, the flow through said cylinder end portion being cut off at the end of the piston stroke except for that permitted through a slight circumferential clearance between a portion of the extension and a portion of the cylinder end portion when the piston has reached the end of its stroke.

The invention has for an object to provide a piston cushioning means which will effect gradual deceleration of the piston as it approaches the end of a stroke and which checks the piston without subjecting the fluid to excessive pressure and without excessive heating of the fluid.

Further objects of the invention are to provide a positive cushioning means that is provided by parts carried by the cylinder and piston which can be easily machined and easily assembled and that functions as the piston nears the end of its stroke to progressively decrease the area of the passage provided between these parts through which the fluid may flow.

Reference should be had to the accompanying drawings forming a part of this specification, in which:

Figure 1 is a longitudinal section through a fluid pressure actuator embodying the invention;

Fig. 2 is a transverse section taken on the line indicated at 2—2 in Fig. 1;

Fig. 3 is a transverse section taken on the line indicated at 3—3 in Fig. 1;

Fig. 4 is a fragmentary longitudinal section taken on the line indicated at 4—4 in Fig. 3;

Figure 7:
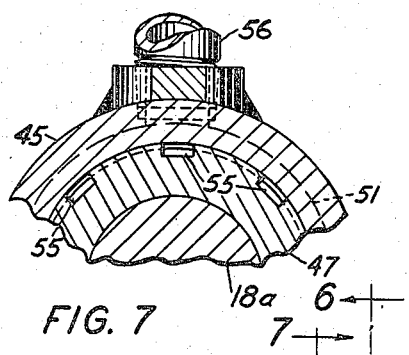
Fig. 7 is a fragmentary transverse section taken on the line indicated at 7—7 in Fig. 5.

In the embodiment of the invention illustrated in Figs. 1 to 4 of the accompanying drawings, the fluid pressure cylinder has a body portion 1 in which a piston 2 has a sliding fit. At one end thereof the cylinder has a cup-shaped head 3 the inner open end of which fits within the cylindrical body 1, the head being positioned by a circumferential flange 4 spaced from its inner end that engages the end of the body 1. To provide a fluid tight connection, a packing ring 5 is interposed between the cylindrical body 1 and the portion of the head 3 that fits within the same. The head is held against turning movement on the cylindrical body by suitable means such as a dowel pin 6 and is clamped to the body 1 by means of a flanged clamping collar 7 screwed on the end of the body 1 and clamping the flange 4 against the end of the body 1. The head 3 is provided with a port 8 which communicates with a conduit 9 through which fluid may be supplied to the cylinder or exhausted therefrom.

The piston 2 is provided with a coaxial cylindrical valve member in the form of an extension 10 of smaller diameter than the piston, that moves into and out of the end portion of the cylinder formed by the head 3 as the piston 2 is reciprocated in the cylinder. The head 3 has a tubular valve member 11 rigidly attached thereto that cooperates with the piston extension 10 to progressively retard the flow of fluid through the head 3 to the outlet port 8 during the final portion of the movement of the piston 2 toward the head 3. The valve member 11 is preferably in the form of a detachable sleeve that is screwed into the inner end of the head 3 and that is locked against turning movements with respect to the head 3 by suitable means such as a lock screw 12. The sleeve 11 is provided with an axial bore 13 that is of a diameter to receive the extension 10 with a slight clearance. The extension 10 and the part 11 are so formed that when the piston is at the end of its stroke, flow of fluid through the part 11 is entirely cut off except for the flow permitted by the clearance between the exterior of the extension 10 and the interior of the bore 13. The extension 10 and sleeve 11 are so formed that as the outer end of the projection 10 moves through the sleeve 11 toward the outer end thereof the cross sectional area of the space between the outer end of the projection 10 and the surrounding portion of the sleeve 11 gradually decreases so that the retardation of flow builds up a progressively increasing pressure acting upon the piston 2 to retard its movement as it approaches the head 3.

As shown in Figs. 1 to 4, the progressive retardation of flow of the fluid is effected by means of longitudinally extending channels 14 and 15 formed at circumferentially spaced points around the interior of the sleeve 11 and opening to the inner end of the sleeve 11 and to the interior thereof. All of the channels 14 and 15 terminate short of the outer end of the sleeve 11 so that flow through these channels is cut off when the piston is at the end of its stroke as shown in Fig. 1.

As shown in Fig. 2 of the drawings, short channels 15 alternate with the long channels 14 throughout the circumference of the bore 13 and both the channels 14 and 15 taper toward their outer ends. The combined cross sectional area of the channels 14 and 15 at the inner end of the sleeve 11 is preferably substantially the same as the cross sectional area of the port 8, so that the liquid flow is not materially restricted until after the outer end of the extension 10 has entered the sleeve 11. As the cross sectional area of the passage through which the fluid flows past the outer end of the extension 10 is decreased, the rate of flow of the fluid through the passage is decreased and, since the back pressure increases at a slower rate during the initial restriction of the passage, the channels 15 are made quite steep and terminate at points nearer the inner end of the sleeve 11 than the outer end so that before the outer end of the extension 10 has reached the midpoint of the sleeve 11, the cross sectional area of the passages formed between the end of the extension 10 and the interior of the sleeve 11 is reduced to less than one-third the area of the discharge port. For hydraulic fluids the clearance between the bore of the sleeve 11 and the extension 10 is only a few thousandths of an inch, somewhat greater clearance being required for hydraulic fluids of relatively high viscosity than for fluids of lower viscosity. For a piston of 4" diameter with an extension of 1¼" diameter the clearance may be .005" more or less depending on the viscosity of the hydraulic fluid. By very rapidly decreasing the cross sectional area of the passages during the initial portion of the movement of the forward end of the extension 10 through the sleeve 11, the velocity of flow of the fluid is quickly but gradually increased to its maximum which would be characteristic of the particular fluid used and the size of the orifice, after which a gradually and uniformly increasing back pressure is created which is effective to retard the piston sufficiently to prevent objectionable impact against the head 3 without subjecting the fluid to an excessive pressure and without objectionable heating of the fluid forced through the clearance space.

When fluid under pressure is admitted through the conduit 9 to the head 3 it acts upon the outer end of the extension 10 and the fluid under pressure also flows through the clearance space between the outer end of the sleeve 11 and the outer end of the extension 10 into the space between the piston 2 and the head 3, the head 3 being provided with short impact lugs or pads 16 at its inner end which provide a space between the head 3 and the piston for entry of fluid under pressure.

The face of the piston 2 opposite that from which the extension 10 projects is provided with a cylindrical extension 17 of reduced diameter which is larger than the extension 10 and which may be formed integrally with the piston 2. A piston rod 18 of less diameter than the extension 17 is attached to the piston 2 and extends through the end of the cylinder opposite that to which the head 3 is attached. The piston rod 18 may be formed integrally with the extension 10, a portion 19 connecting the extension 10 and the rod 18 being threaded and screwed into an axial bore in the piston 2. A counterbore 20 is formed in the extension 17 and the piston 2 and receives a reduced portion 21 of the piston rod 18, the rod 18 being provided with a shoulder 22 that engages with the outer end of the extension 17. Suitable means such as a screw 23 may be provided for holding the rod 18 against turning movements with respect to the piston 2. The rod 18 extends through a tubular head 24 that is screwed onto the end of the cylindrical body 1 opposite that to which the head 3 is attached, the head 24 being held against turning movements with respect to the cylindrical body 1 by suitable means such as screws 25. The head 24 is provided at its outer end with a flange 26 which serves to retain a bearing sleeve 27 and a second sleeve 28 that are interposed end to end between the flange 26 and the cylinder body 1. Suitable packing 29 which may be of the Chevron ring type is mounted in an internal recess in the member 28 which opens to the outer end of the member so that the packing 29 is retained between the sleeves 27 and 28. A sealing ring 30 is provided in the flange 26 that engages the rod 18 to prevent leakage of fluid between the exterior of the rod 18 and the end opening of the head 24.

Inwardly of the sealing ring 30 the bearing sleeve 27 has a recess 31 on the outer end thereof that surrounds the rod 18 and this recess is connected by a passage 32 to a drain outlet 33 through which any fluid leaking past the bearing sleeve 27 may be discharged.

The inner sleeve 28 has a counterbore 34 that opens to the inner end thereof and this counterbore is of a diameter to receive the piston extension 17 with a slight clearance. The exterior face of the sleeve 28 is provided with a circumferential groove 35 which forms an annular chamber within the head 24 which communicates with the counterbore 34 through a series of circumferentially spaced openings 36. A port 37 is provided in the head 24 that opens to the annular chamber 35 and to a conduit 38 through which fluid may be introduced into the cylinder or exhausted from the cylinder. The total cross sectional area of the annular space around the piston rod 18 provided by the counterbore 34 will approximate the area of the port 37. The piston extension 17 and the sleeve 28 provide a fliud flow control valve and coact in a manner similar to the extension 10 and sleeve 11 to retard the movement of the piston 2 as it approaches the end of a stroke toward the head 24. The extension 17 is of a length such that it moves into and out of the counterbore 34 during reciprocation of the piston and, in order to provide progressive retardation of the flow of fluid past the end of the extension 17 as the extension 17 moves into the counterbore 34, the sleeve 28 is provided with long channels 39 and short channels 40 which open to the counterbore and to the inner end of the sleeve 28. The long channels 39 terminate short of the openings 36 and the extension 17 is of a length to extend past the outer ends of the channels 39 when the piston 2 is at the end of its stroke.

As shown in Fig. 3, eight equally spaced openings are provided between the annular chamber 35 and the counterbore 34 and the channels 39 and 40 are disposed in alinement with the openings 36 to provide less interference with the flow of fluid through the counterbore 34 to the chamber 35. As in the case of the channels 14 and 15, the total cross sectional area of the channels 39 and 40 at the inner end of the sleeve 28 is not appreciably less than the cross sectional area of the bore 37 through which the fluid is discharged and, when the piston is at the end of its stroke flow is cut off except for that permitted by the slight clearance between the outer end of the extension 17 and the portion of the counterbore 34 disposed outwardly of the channels 39, the retarding action effected by the coaction of the extension 17 and the sleeve 28 which receives it being substantially the same as that between the extension 10 and the part 11 of the head 3.

In order to prevent leakage past the exterior of the sleeve 28, a packing ring 41 is interposed between the inner end of the sleeve and the cylinder body 1 and packing rings 42 and 43 are interposed between the exterior of the sleeve 28 and the interior of the head 24 on opposite sides of the annular chamber 35. In order to effectively apply pressure to the face of the piston to move the same away from the head 24, the inner end of the sleeve 28 is provided with short projecting lugs or stop pads 44 which space the piston away from the end of the sleeve 28 so as to enable fluid pressure to be applied to the piston face The flow control valves formed by the telescoping piston and cylinder parts also control the entry of fluid into the cylinder pressure chambers to provide a gradually increasing volume on the piston to start the same in either direction quickly but with gradual acceleration, thereby eliminating starting shock.

Figure 5:
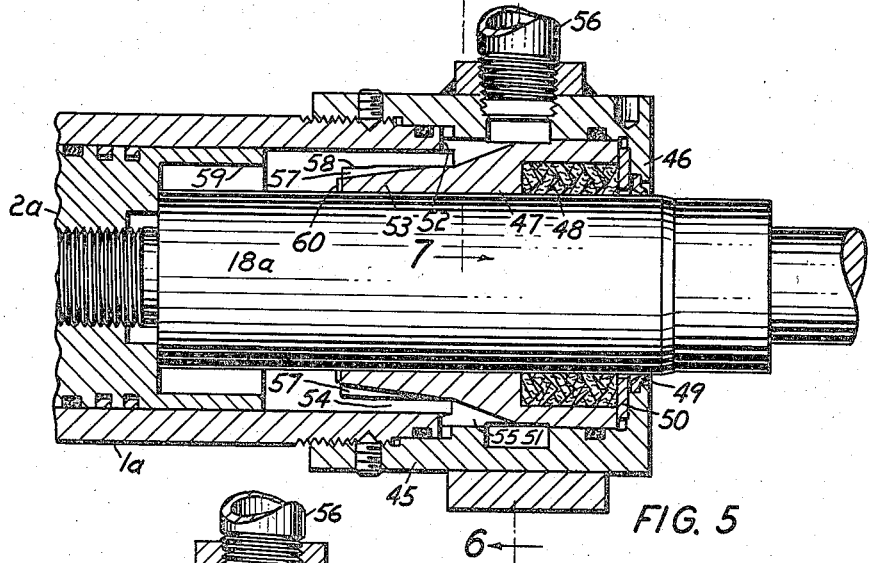
Fig. 5 is a fragmentary longitudinal section through a fluid pressure actuator showing a modified form of piston cushioning means.
Figure 6:
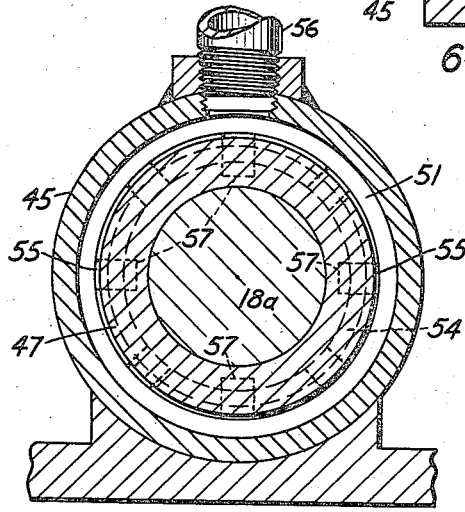
Fig. 6 is a transverse section taken on the line indicated at 6—6 in Fig. 5.

Figs. 5 to 7 of the drawings show a modified piston cushioning structure at the end of the cylinder through which the piston rod extends. In this modification a cylinder 1a has a piston 2a to which a piston rod 18a is attached and the piston rod 18a extends through a tubular head 45 into which the end of the cylinder 1a is screwed. The tubular head has a flange 46 at its outer end surrounding the piston rod opening and serving as a retainer for a bearing sleeve 47 which is clamped between the flange 46 and the adjacent end of the cylinder 1a. The inner end portion of the sleeve 47 fits closely around the piston rod to provide an elongated bearing and the outer end portion thereof is internally recessed to receive a packing sleeve 48. A flexible scraper ring 49 is provided in the flange 46 and engages the piston rod 18a and an annular disk 50 interposed between the flange 46 and sleeve 47 serves as a retainer for the packing sleeve 48 and the scraper ring 49.

The tubular head 45 is provided with an internal circumferential recess that provides an annular chamber 51 surrounding the bearing sleeve 47. The bearing sleeve 47 has a shoulder portion 52 that engages the end of the cylinder 1a and a reduced inner end portion 53 of an external diameter less than the internal diameter of the cylinder 1a which projects into the cylinder to provide an annular space 54 open to the cylinder. The sleeve 47 has circumferentially spaced longitudinal channels 55 formed in its periphery that extend from the shoulder 52 and part way across the chamber 51. The shoulder portion 52 of the sleeve 47 projects past the outer end of the annular space 54 so that the annular chamber 51 opens to the interior of the cylinder 1a through the channels 55 and the annular space 54. A conduit 56 connected to the sleeve 47 serves to deliver fluid to the cylinder through the chamber 51, channels 55 and annular space 54, or to conduct fluid from the cylinder, the space 54 having a cross sectional area greater than that of the conduit 56.

The reduced portion 53 of the bearing sleeve 47 has tapering channels 57 that are preferably alined with certain of the channels 55 and that extend throughout the major portion of the length of the extension 53 subtantially uniformly increasing in depth to the inner end of the extension 53 and fading out near the outer end thereof. The extension 53 also has a short tapered portion 58 at its inner end. The piston 2a is counterbored to provide a hollow cylindrical end portion or extension 59 that moves into and out of the annular space 54 and fits the extension 53 with only a slight clearance. The reduced portion 53 of the sleeve 47 and the tubular extension 59 of the piston provide a fluid flow control valve during the portion of the piston stroke in which they are in telescoping relation. The piston is cushioned at the end of its stroke in a manner similar to the modification first described, the discharge of fluid being progressively restricted as the outer end of the piston extension 59 moves over the reduced portion 53 of the bearing sleeve 45. While the outer end of the extension 59 moves over the short tapered portion 58 the cross sectional area of the fluid escape passage is rapidly decreased to less than one-third the area of the discharge port during the movement of said outer end of the piston extension to the outer ends of the channels 57, the escape passage is gradually reduced to the very restricted clearance between the interior of the piston extension 59 and the exterior of the reduced portion 53 of the sleeve. Maximum resistance to movement of the piston is exerted only when the piston is very near the end of its stroke, so that the velocity of the fluid flow is quickly but gradually increased to its maximum and back pressure created to cushion the piston stroke with a minimum increase in the time required for the stroke and without objectionable heating of the fluid as in the modification first described.

When the flow of fluid is reversed the fluid flows from the chamber 51 through the channels 55 and through the clearance space between the outer end of the piston extension 59 and the reduced portion 53 of the sleeve and acts upon the end of the extension 59 and upon the exposed portion of the piston face radially inwardly of the extension 59. In order to facilitate the initial movement of the piston away from the head 45 the inner end of the sleeve 47 is preferably provided with spaced stop lugs or pads 60 similar to the stop lugs 16 and 44 which serve to limit the piston movement and to space the inner end face of the sleeve 47 from the piston face.

It should be noted that the bearing sleeve 47 serves also as a part of the cushioning means whereas in the modification shown in Figs. 1 to 4 two separate sleeves 27 and 28 are provided. In an actuator in which the piston has quite a long stroke the relatively long head provided in the modification shown in Figs. 1 to 4 will be advantageous. Where the piston stroke is relatively short the head shown in Figs. 5 to 7 is preferred.

It is to be understood that in accordance with the provisions of the patent statutes, variations and modifications of the specific devices herein shown and described may be made without departing from the spirit of the invention.

What I claim is:

1. A fluid pressure actuator comprising a cylinder having a head provided with a port through which fluid may be admitted to the cylinder or exhausted therefrom, a piston slidable in said cylinder toward and away from said head, and a valve between said piston and said port controlling flow of fluid into or out of said cylinder, said valve comprising a member fixed to said head and coaxial with the cylinder and piston and a member fixed to said piston, coaxial therewith and forming an extension thereof, said piston attached member being movable into and out of telescopic relation to said first mentioned valve member and said valve members providing a fluid passageway between them which provides the sole means of egress of fluid from or ingress of fluid to the space between said piston and said head, said members having circumferentially continuous cylindrical internal and external face portions which are brought into juxtaposition when the piston is at the limit of its movement toward said head and which are separated by a slight clearance when in juxtaposition, said valve members having other peripheral face portions of greater axial length than said first mentioned face portions that provide said passageway with a cross sectional area no smaller than that of said port when said valve members are first brought into telescopic relation and that are relatively tapered longitudinally to provide progressive restriction of said passageway during movement of the piston toward said limit of movement, said other peripheral portions having substantially uniform relative taper throughout the major portion of the length thereof and a greater relative taper in the end portions thereof that first enter into telescopic relation.

2. A fluid pressure actuator as set forth in claim 1 in which one of the valve members is provided with circumferentially spaced longitudinal channels that extend throughout the major portion of the length of the member that are of gradually decreasing depth toward the circumferentially continuous peripheral portion thereof and that fade out adjacent said circumferentially continuous portion and with shorter longitudinal channels intermediate said first mentioned channels that have a greater taper and terminate farther away from said circumferentially continuous portion.

3. A fluid pressure actuator as set forth in claim 1 in which the piston attached valve member is received within the cylinder attached valve member.

4. A fluid pressure actuator as set forth in claim 1 in which the cylinder attached valve member is received within the piston attached valve member.

5. A fluid pressure actuator comprising a cylinder having a head provided with a port through which fluid may be admitted or exhausted, a piston slidably fitting in said cylinder, and a valve controlling discharge of fluid through said port, said valve comprising a tubular member fixed to the cylinder within and coaxial with the same and that provides the sole passage for fluid to or from the space between said piston and said head and a member fixed to the piston and forming an extension thereof that moves into and out of said tubular member during reciprocation of said piston and that has a portion that is of a diameter to be received with small clearance within a part of said tubular member when said piston is at the limit of its movement toward said tubular member, the external and internal faces of said piston extension and said tubular member being formed to provide a passageway for fluid between them that is of a cross sectional area no smaller than that of said port when the outer end of said piston extension enters said tubular member, said faces having relative longitudinal taper and the portions thereof which are in juxtaposition when said piston extension enters the inner end of said tubular member having greater relative taper whereby said passageway rapidly decreases in cross sectional area during the initial portion of the outward movement of the outer end of said extension into said tubular member and that more gradually decreases in cross sectional area during the remainder of the outward movement.

6. A cylinder and piston actuator in which the cylinder has a head and the piston an attached piston rod extending through the head, a bearing sleeve attached to said head in which said piston rod slides, said head having a lateral port and said head and sleeve being formed to provide an annular chamber exteriorly of said sleeve that communicates with said port, said sleeve being formed to provide an elongated annular space that opens inwardly toward said piston and circumferentially spaced openings from the outer end portion of said annular space to said annular chamber, a tubular extension carried by said piston and movable into and out of said annular space where it is in telescopic relation to said sleeve, said extension and sleeve when in telescopic relation having spaced axially extending surfaces forming an annular passage that provides the sole path for the flow of fluid into or out of the space between said piston and said head, the outer end portions of said extension and sleeve having closely spaced cylindrical surfaces axially inwardly of said openings, the surface of said sleeve forming a wall of said annular passage having longitudinal grooves that are axially alined with certain of said openings, that extend from the inner end of said sleeve, that terminate inwardly of said openings and that gradually decrease in depth from their inner to their outer ends to progressively decrease the cross sectional area of the passage and increase the back pressure of the piston as it approaches the end of its outward stroke.

References Cited in the file of this patent

UNITED STATES PATENTS

| | | |
|---|---|---|
| 244,092 | Thayer | July 12, 1881 |
| 655,012 | Reynolds | July 31, 1900 |
| 845,827 | Steedman | Mar. 5, 1907 |
| 875,543 | Lynch | Dec. 31, 1907 |
| 1,011,338 | Furlow | Dec. 12, 1911 |
| 2,293,167 | Overbeke | Aug. 18, 1942 |
| 2,363,142 | Reed | Nov. 21, 1944 |
| 2,493,602 | Sterrett | Jan. 3, 1950 |
| 2,591,410 | Dayton | Apr. 1, 1952 |
| 2,710,595 | Peterson | June 14, 1955 |